(12) United States Patent
Decker et al.

(10) Patent No.: US 11,993,028 B2
(45) Date of Patent: May 28, 2024

(54) ORGANIC-INORGANIC COMPOSITES AND METHODS OF MANUFACTURING THEREOF

(71) Applicant: Corning Incorporated, Corning, NY (US)

(72) Inventors: Heather Bossard Decker, Arkport, NY (US); Shandon Dee Hart, Elmira, NY (US); Yanfei Li, Corning, NY (US); Joseph Edward McCarthy, Hornell, NY (US); David John McEnroe, Corning, NY (US); Mark Alejandro Quesada, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 700 days.

(21) Appl. No.: 17/258,958

(22) PCT Filed: Jun. 24, 2019

(86) PCT No.: PCT/US2019/038691
§ 371 (c)(1),
(2) Date: Jan. 8, 2021

(87) PCT Pub. No.: WO2020/013980
PCT Pub. Date: Jan. 16, 2020

(65) Prior Publication Data
US 2022/0016854 A1    Jan. 20, 2022

Related U.S. Application Data

(60) Provisional application No. 62/695,413, filed on Jul. 9, 2018.

(51) Int. Cl.
*B29C 70/20* (2006.01)
*C03C 3/19* (2006.01)
(Continued)

(52) U.S. Cl.
CPC ............... *B29C 70/20* (2013.01); *C03C 3/19* (2013.01); *C03C 13/00* (2013.01);
(Continued)

(58) Field of Classification Search
CPC ............ C08L 81/06; C08L 93/00; C08K 3/04
See application file for complete search history.

(56) References Cited

U.S. PATENT DOCUMENTS 3,690,908 A    9/1972  Greco et al.
3,732,181 A    5/1973  Ray et al.
(Continued)

FOREIGN PATENT DOCUMENTS

CN    1329580 A      1/2002
EP    0773196 A1 *   5/1997
(Continued)

OTHER PUBLICATIONS

Lim et al., Properties and structures of tin borophosphate glasses, 2010, Journal of Non-Crystalline Solids 356, pp. 1379-1384.*
(Continued)

*Primary Examiner* — Eli D. Strah

(57) ABSTRACT

A composite has repeating domains of an inorganic glass and a polymer, such that the inorganic glass and the polymer each have a glass transition temperature ($T_g$) or softening temperature of less than 450° C., and at least 50% of the inorganic glass domains have a length of less than 30 μm as measured along at least one cross-sectional dimension.

18 Claims, 10 Drawing Sheets

(51) Int. Cl.
  *C03C 13/00* (2006.01)
  *B29K 79/00* (2006.01)
  *B29K 81/00* (2006.01)
  *B29K 309/08* (2006.01)
(52) U.S. Cl.
  CPC .... *B29K 2079/085* (2013.01); *B29K 2081/04* (2013.01); *B29K 2081/06* (2013.01); *B29K 2309/08* (2013.01); *C03C 2213/00* (2013.01)

(56) References Cited

U.S. PATENT DOCUMENTS

| | | | |
|---|---|---|---|
| 4,323,654 A | 4/1982 | Tick et al. | |
| 4,362,819 A | 12/1982 | Olszewski et al. | |
| 4,379,070 A | 4/1983 | Tick | |
| 4,920,081 A | 4/1990 | Beall et al. | |
| 4,996,172 A | 2/1991 | Beall et al. | |
| 5,043,369 A | 8/1991 | Bahn et al. | |
| 5,122,484 A | 6/1992 | Beall et al. | |
| 5,246,890 A | 9/1993 | Aitken et al. | |
| 5,328,874 A | 7/1994 | Beall et al. | |
| 5,872,067 A | 2/1999 | Meng et al. | |
| 6,013,716 A * | 1/2000 | Nomura | C08J 5/06 525/906 |
| 6,268,425 B1 | 7/2001 | Frayer et al. | |
| 6,667,258 B2 | 12/2003 | Quinn | |
| 6,737,375 B2 | 5/2004 | Buhrmaster et al. | |
| 7,166,661 B2 | 1/2007 | Kuramoto et al. | |
| 2003/0105200 A1 | 6/2003 | Greiner et al. | |
| 2003/0129413 A1 | 7/2003 | Greiner et al. | |
| 2003/0149160 A1 | 8/2003 | Greiner et al. | |
| 2004/0191539 A1 | 9/2004 | Kuramoto et al. | |
| 2007/0290405 A1 | 12/2007 | Otaigbe et al. | |
| 2011/0043719 A1 | 2/2011 | Thunhorst et al. | |
| 2012/0040002 A1 | 2/2012 | Lehtonen et al. | |
| 2015/0133934 A1 | 5/2015 | Felfel et al. | |
| 2016/0347644 A1* | 12/2016 | Dabich II | C03C 13/00 |
| 2017/0254930 A1 | 9/2017 | Hart et al. | |
| 2019/0023603 A1* | 1/2019 | Decker | C03B 19/025 |

FOREIGN PATENT DOCUMENTS

| | | | | |
|---|---|---|---|---|
| EP | 1621575 A1 | 2/2006 | | |
| KR | 10-1285306 B1 | 7/2013 | | |
| WO | 2012/058314 A2 | 5/2012 | | |
| WO | WO-2012058314 A2 * | 5/2012 | | B01J 2/00 |

OTHER PUBLICATIONS

Table 21.7. Properties of Polysulfones. (Retrieved Nov. 2, 2023 from https://app.knovel.com/hotlink/itble/rcid:kpBPME0001/id:kt00XRETU3/brydsons-plastics-materials/table-21-7-properties).*

Adalja et al., "Melt Rheology of Tin Phosphate Glasses", Applied Rheology Jan./Feb. 2001, vol. 11, No. 1, pp. 10-18.

Adalja et al., "Glass-polymer melt hybrids. I: Viscoelastic properties of novel affordable organic-inorganic polymer hybrids." Polymer Engineering & Science 41.6 (2001): 1055-1067.

Barber et al., "Extreme strength observed in limpet teeth," J. R. Soc. Interface 12: 20141326 (2014).

Blair, Gerald E., et al. "New high index optical glasses." Emerging Optical Materials. vol. 297. International Society for Optics and Photonics, 1982.

Brow, Richard K., and David R. Tallant. "Structural design of sealing glasses." Journal of Non-Crystalline Solids 222 (1997): 396-406.

Burger, H., et al. "Glass formation, properties and structure of glasses in the TeO2 ZnO system." Journal of non-crystalline solids 151.1-2 (1992): 134-142.

Cordero et al; "Channel Cracks in a Hermetic Coating Consisting of Organic and Inorganic Layers"; Applied Physics Letters, 90, (2007); 111910-1-111910-3.

Deng, D. S., et al. "Exploration of in-fiber nanostructures from capillary instability." Optics express 19.17 (2011): 16273-16290.

Deng, D. S., et al. "In-fiber semiconductor filament arrays." Nano letters 8.12 (2008): 4265-4269.

Frieser, R. G. "A review of solder glasses." Active and Passive Electronic Components 2.3 (1975): 163-199.

Grossman, Do, and C. J. Phillips. "Zinc Borophosphate Glass." Journal of the American Ceramic Society 47.9 (1964): 471-471.

Hart et al; "External Reflection From Omnidirectional Dielectric Mirror Fibers"; Science, vol. 296, (2002); pp. 510-513.

Hashimoto, Tadanori, et al. "ZnO—Bi2O3—B2O3 glasses as molding glasses with high refractive indices and low coloration codes." Journal of the American Ceramic Society 94.7 (2011): 2061-2066.

Inoue, Taisuke, et al. "Approach to thermal properties and electronic polarizability from average single bond strength in ZnO Bi2O3 B2O3 glasses." Journal of solid state chemistry 183.12 (2010): 3078-3085.

International Search Report and Writien Opinion PCT/US2018/042810 dated Oct. 2, 2018.

International Search Report and Written Opinion of the International Searching Authority; PCT/US2019/038691; dated Oct. 28, 2019; 13 pages; European Patent Office.

Jackson et al; "The Mechanical Design of Nacre"; Proc. R. Soc. Lond. B.; 234; (1988); 29 Pages.

Karim, M. M., and D. Holland. "Physical properties of glasses in the system SnO—SiO2." Physics and chemistry of glasses 36.5 (1995): 206-210.

Kaufman et al; "Thermal Drawing of High-Density Macroscopic Arrays of Well-Ordered Sub-5-NM-Diameter. Nanowires"; Nano Lett. 11, (2011) pp. 4768-4773.

Kaufman, Joshua J., et al. "Structured spheres generated by an in-fibre fluid instability." Nature 487.7408 (2012): 463.

Kitamura, Naoyuki, et al. "Optical properties of fluorine-substituted zinc bismuth phosphate glasses." Journal of Non-Crystalline Solids 357.3 (2011): 1188-1192.

Kitamura, Naoyuki, et al. "Optical properties of zinc bismuth phosphate glass." Materials Science and Engineering: B 161.1-3 (2009): 91-95.

Klyuev, V. P., and B. Z. Pevzner. "Thermal expansion and glass transition temperature of calcium borate and calcium aluminoborate glasses." Glass physics and chemistry 29.2 (2003): 127-136.

Koudelka, L., and P. Mosner. "Borophosphate glasses of the ZnO—B2O3—P2O5 system." Materials Letters 42.3 (2000): 194-199.

Kozhukharov, Vladimir, et al. "A new family of tellurite glasses." Journal of Materials Science 18.5 (1983): 1557-1563.

Kudesia, Rajiv, et al. "Optical properties of glasses in the system CaO—Al2O3—B2O3." Properties and Characteristics of Optical Glass III. vol. 2287. International Society for Optics and Photonics, 1994.

Lee, E. T. Y., and E. R. M. Taylor. "Compositional effects on the optical and thermal properties of sodium borophosphate glasses." Journal of Physics and Chemistry of Solids 66.1 (2005): 47-51.

Li and Ortiz, "Pervasive nanoscale deformation twinning as a catalyst for efficient energy dissipation in a bioceramic armour," Nature Materials 13, 501 (2014).

Lim, Jong Wook, et al. "Properties and structures of tin borophosphate glasses." Journal of Non-Crystalline Solids 356.28-30 (2010): 1379-1384.

Metwalli, E., and Richard K. Brow. "Modifier effects on the properties and structures of aluminophosphate glasses." Journal of non-crystalline solids 289.1-3 (2001): 113-122.

Morena, R. "Phosphate glasses as alternatives to Pb-based sealing frits." Journal of non-crystalline solids 263 (2000): 382-387.

Nassau, Kurt, and D. L. Chadwick. "A survey of some germania-containing glass-forming compositions." Materials Research Bulletin 17.6 (1982): 715-719.

Nassau, Kurt, and D. L. Chadwick. "Glass-Forming Systems Involving GeO2 with Bi2O3, Ti2O, and PbO." Journal of the American Ceramic Society 65.10 (1982): 486-491.

Otaigbe, Joshua U., Candace J. Quinn, and George H. Beall. "Processability and properties of novel glass-polymer melt blends." Polymer composites 19.1 (1998): 18-22.

(56) References Cited

OTHER PUBLICATIONS

Park et al; Thin Film Encapsulation for Flexible AM-OLED: A Review; Semicond. Sci. Technol.; 26; (2011) 8 Pages.
Podsiadlo et al; "Ultrastong and Stiff Layered Polymer Nanocomposites"; Science; vol. 318; (2007); pp. 80-83.
Riebling, E. F. "Depolymerization of $GeO_2$ and $B_2O_3$—$GeO_2$ Network Glasses by $Sb_2O_3$." Journal of the American Ceramic Society 56.6 (1973): 303-309.
Song, Joon-Young, and Se-Young Choi. "Fabrication and characterization of Pb-free transparent dielectric layer for plasma display panel." Displays 27.3 (2006): 112-116.
Song, Joon-Young, Tae-Jin Park, and Se-Young Choi. "Preparation and characterization of CuO doped $Bi_2O_3$—$B_2O_3$—BaO—ZnO glass system for transparent dielectric layer." Journal of non-crystalline solids 352.50-51 (2006): 5403-5407.
Tang et al., "Nanostructured artificial nacre," Nature Materials 2, 413 (2003).
Urman, Kevin, and Joshua U. Otaigbe. "New phosphate glass/polymer hybrids—Current status and future prospects." Progress in Polymer Science 32.12 (2007): 1462-1498.
Weber et al; "Giant Birefringent Optics in Multilayer Polymer Mirrors"; Science; vol. 287; (2000) pp. 2451-2456.
Yaman et al; "Arrays of Indefinitely Long Uniform Nanowires and Nanotubes"; Nature Materials; vol. 10, Jul. 2011; pp. 494-501.
Chinese Patent Application No. 201880048626.6, Office Action dated Nov. 19, 2021, 19 pages (13 pages of English Translation and 6 pages of Original Copy), Chinese Patent Office.

\* cited by examiner

ORGANIC-INORGANIC COMPOSITES AND METHODS OF MANUFACTURING THEREOF

CROSS-REFERENCE TO RELATED APPLICATIONS

This application is a National Stage application under 35 U.S.C. § 371 of International Application No. PCT/US2019/038691, filed on Jun. 24, 2019, which claims the benefit of priority under 35 U.S.C. § 119 of U.S. Provisional Application Ser. No. 62/695,413, filed Jul. 9, 2018, the contents of all of which are relied upon and incorporated herein by reference in their entirety.

BACKGROUND

1. Field

This disclosure relates to organic-inorganic composites and methods of manufacturing thereof.

2. Technical Background

Sub-micron nano-scale organic-inorganic composites are naturally available as biological materials in, for example, nacre and abalone shells, and are characterized by strength due to the inorganic domain, an enhanced toughness due to the nanostructure and ductile organic phase, and in some cases, good optical transmission.

Attempts to formulate and fabricate man-made organic-inorganic composites that mirror those that are naturally available have been limited to small-scale and relatively expensive laboratory approaches. Scalable and cost-effective formulations and manufacturing processes of these strong and tough nano-composites remains a challenge in conventional technologies. Specifically, current technologies are unable to produce well-controlled, repeating micro- or nano-sized domains containing sufficient levels of inorganic material content to achieve desired mechanical properties of such organic-inorganic composites.

The disclosure discloses improved organic-inorganic composites and methods of manufacturing thereof.

SUMMARY

In some embodiments, a composite has repeating domains of an inorganic glass and a polymer, wherein the inorganic glass and the polymer each have a glass transition temperature ($T_g$) or softening temperature of less than 450° C., and wherein at least 50% of the inorganic glass domains have a length of less than 30 μm as measured along at least one cross-sectional dimension.

In one aspect, which is combinable with any of the other aspects or embodiments, the inorganic glass domains have an average length as measured along at least one cross-sectional dimension, and wherein at least 90% of the inorganic glass domains have a length as measured along at least one cross-sectional dimension within 50% of the average length.

In one aspect, which is combinable with any of the other aspects or embodiments, the inorganic glass has a glass transition temperature in a range of 200° C. to 450° C., and the polymer is a thermoplastic polymer.

In one aspect, which is combinable with any of the other aspects or embodiments, the inorganic glass comprises at least one of an oxide glass, a fluoride glass, an oxyfluoride glass, a phosphate glass, a borate glass, a germanate glass, a tellurite glass, a vanadate glass, or combinations thereof.

In one aspect, which is combinable with any of the other aspects or embodiments, the inorganic glass comprises at least one of alkali-zinc sulfophosphates, tin borophosphates, zinc phosphates, zinc borophosphates, tin phosphates, zinc borates, bismuth borates, zinc bismuth borates, tin-zinc borophophates, antimony germanates, tellurites, tellurium vanadates, flourophosphates, tin fluorophosphates, alkali fluorophosphates, alkali-aluminum fluorophosphates, alkali-tantalum borophosphates, tin silicates, alkaline earth aluminoborates, alkali aluminophosphates, alkaline earth aluminophosphates, alkali borophosphates, alkali-zinc phosphates, alkali-tin-zinc phosphates, alkali-aluminum borophosphates, or combinations thereof.

In one aspect, which is combinable with any of the other aspects or embodiments, the polymer comprises at least one of polyetherimide (PEI), polyethersulfone (PES), polyphenylsulfone (PPS), or a combination thereof.

In one aspect, which is combinable with any of the other aspects or embodiments, the inorganic glass domain is a shape comprising at least one of a two-dimensional planar layer, fiber, filament, ribbon, sphere, brick, platelet, or a combination thereof.

In one aspect, which is combinable with any of the other aspects or embodiments, the inorganic glass domain is a discontinuous phase comprising a plurality of adjacent and similarly oriented fibers of an inorganic material, the polymer domain is a continuous phase surrounding the plurality of adjacent and similarly oriented fibers of the inorganic material, and the composite is a plurality of adjacent and similarly oriented fibers of inorganic material contained within a similarly oriented host fiber of the polymer.

In one aspect, which is combinable with any of the other aspects or embodiments, the inorganic glass domain comprises a plurality of cylindrical filaments having a diameter in a range of 50 nm to 400 nm separated by a continuous polymer domain.

In one aspect, which is combinable with any of the other aspects or embodiments, the inorganic glass domain further comprises at least one of cylindrical structures, layers, platelets, brick-like structures, or a combination thereof having a domain characteristic length in a range of 0.1 μm to 3 μm.

In one aspect, which is combinable with any of the other aspects or embodiments, the inorganic glass comprises: a $B_2O_3$ component at a concentration in a range of 0.5 wt. % to 10 wt. %; a $P_2O_5$ component at a concentration in a range of 30 wt. % to 40 wt. %; and a SnO component at a concentration in a range of 60 wt. % to 70 wt. %.

In one aspect, which is combinable with any of the other aspects or embodiments, the inorganic glass comprises less than 10 mol. % of a glass additive, the additive including at least one of $SiO_2$, $Al_2O_3$, $TiO_2$, $WO_3$, $CeO_2$, CaO, BaO, SrO, $SO_3$, $MoO_3$, SnO, $SnF_2$, $Sn^0$ metal, ammonium phosphates, or combinations thereof.

In one aspect, which is combinable with any of the other aspects or embodiments, at least 90% of the inorganic glass domains have a length of less than 30 μm as measured along the at least one cross-sectional dimension.

In one aspect, which is combinable with any of the other aspects or embodiments, at least 90% of the inorganic glass domains have a length of less than 10 μm as measured along the at least one cross-sectional dimension.

In one aspect, which is combinable with any of the other aspects or embodiments, at least 90% of the inorganic glass domains have a length of less than 5 μm as measured along the at least one cross-sectional dimension.

In one aspect, which is combinable with any of the other aspects or embodiments, at least 90% of the inorganic glass domains have a length of less than 1 μm as measured along the at least one cross-sectional dimension.

In some embodiments, a method of forming an organic-inorganic composite, comprises: melting at a suitable temperature, a tin composite oxide material and a boron-containing material (e.g., boric acid); pouring or extruding the product of the melting into a rod and annealing the rod to form an annealed glass rod; encapsulating the annealed glass rod in a thermoplastic polymer to form a glass-polymer structure; heating the glass-polymer structure at a temperature above the glass transition temperature ($T_g$) or softening temperature of both the glass rod and the thermoplastic polymer to form a preform; drawing the preform to form a first drawn fiber having a first diameter; bundling the first drawn fiber into a first array comprising a plurality of the first drawn fibers; and heat treating the plurality of fibers to form the organic-inorganic composite.

In one aspect, which is combinable with any of the other aspects or embodiments, the tin composite oxide comprises at least one of $Sn_2P_2O_7$, $SnO$, $Sn^{2+}$-containing oxides, or combinations thereof.

In one aspect, which is combinable with any of the other aspects or embodiments, the thermoplastic polymer comprises at least one of polyetherimide (PEI), polyethersulfone (PES), polyphenylsulfone (PPS), or a combination thereof.

In one aspect, which is combinable with any of the other aspects or embodiments, the heating is conducted at a temperature in a range of 200° C. to 450° C.

In one aspect, which is combinable with any of the other aspects or embodiments, heat treating the drawn fiber comprises heating at a temperature in a range of 250° C. to 350° C. for a time in a range of 1 hr to 20 hrs in a vacuum or inert environment.

In one aspect, which is combinable with any of the other aspects or embodiments, the method further comprises: a second drawing to form a second drawn fiber having a second diameter; and a second bundling of the second drawn fiber to form a second array comprising a plurality of the second drawn fibers, wherein the second diameter is less than the first diameter.

In one aspect, which is combinable with any of the other aspects or embodiments, the method further comprises: a third drawing to form a third drawn fiber having a third diameter; and a third bundling of the third drawn fiber to form a third array comprising a plurality of the third drawn fibers, wherein the third diameter is less than the second diameter.

In one aspect, which is combinable with any of the other aspects or embodiments, the method further comprises: hot-pressing the organic-inorganic composite at a temperature in a range of 300° C. to 500° C., wherein a temperature gradient is formed between a surface of the composite in contact with the hot press and a distance into the composite not in contact with the hot press.

BRIEF DESCRIPTION OF THE DRAWINGS

The disclosure will become more fully understood from the following detailed description, taken in conjunction with the accompanying figures, in which.

DETAILED DESCRIPTION

Figure 1:
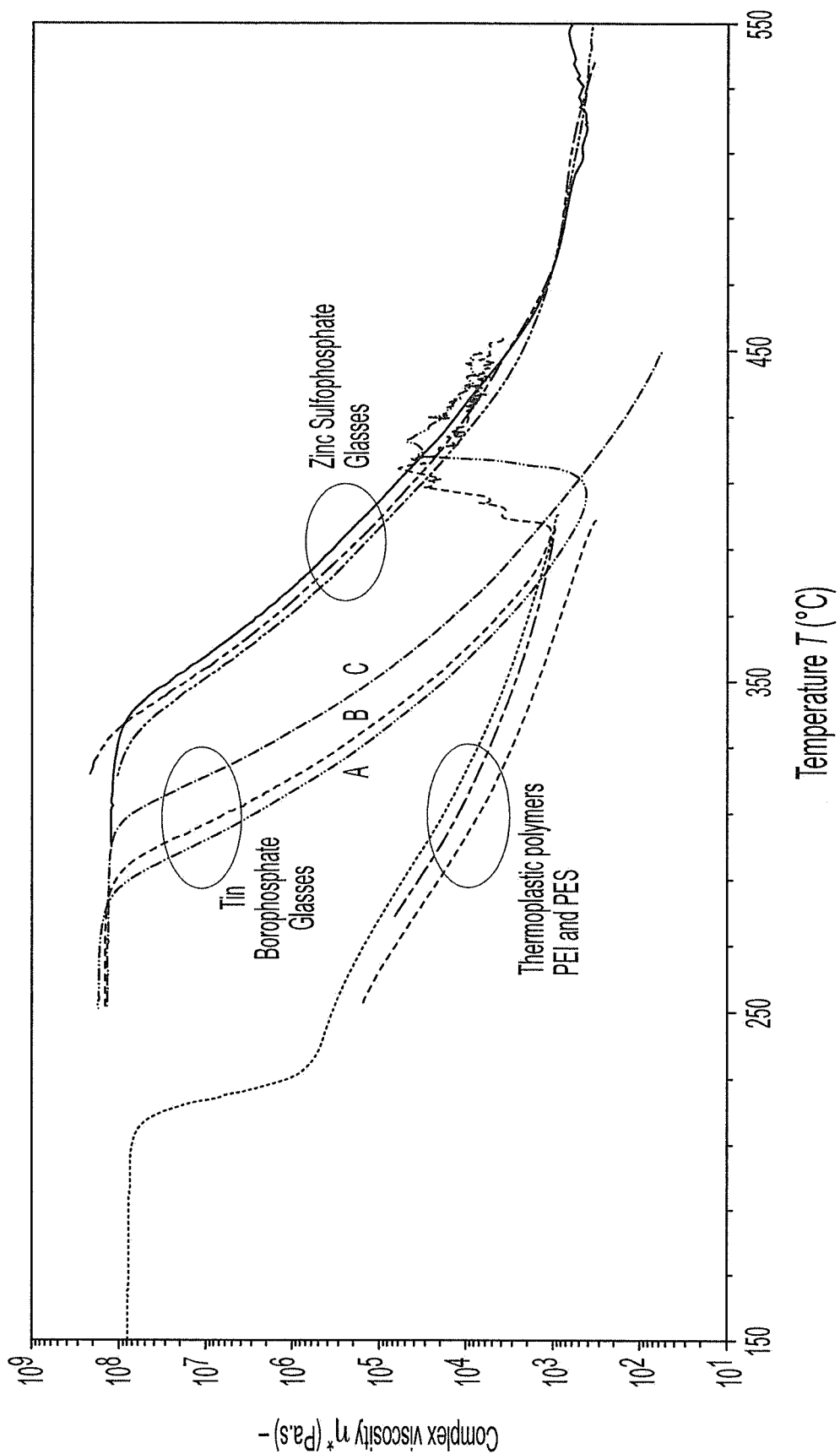
FIG. 1 illustrates a parallel plate viscosity versus temperature plot of selected thermoplastic polymers and inorganic glasses materials, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

The present disclosure relates to organic-inorganic composites and their methods of production. More particularly, the present application provides a method for making the disclosed composite(s) where the organic and inorganic components are both thermally formable due to substantial amorphous, glassy, or thermoplastic character, and the organic and inorganic components are thermally formed in contact with one another at an identical or near-identical process set point temperature(s) in a single process chamber or apparatus (e.g., an optical fiber draw tower, a multi-component melting apparatus, or a multi-component extruder, a nozzle, a die, an orifice, or other fixed point where the organic and inorganic components are brought together in a controlled manner at elevated temperature).

The organic and inorganic components can both have a viscosity below about $10^{10}$ Poise (i.e., $10^9$ Pa·s), below about $10^9$ Poise, or even below about $10^8$ Poise, at the point when they are brought into contact at an elevated temperature (e.g., a temperature in a range of 50° C. to greater than 150° C., or even to greater than 250° C.). FIG. 1 illustrates the relationship between viscosity and temperature for selected thermoplastic polymers (e.g., PEI and PES) and inorganic glass materials (e.g., tin borophosphate and zinc sulfophosphate), according to some embodiments.

In some embodiments, a low glass transition temperature ($T_g$) or low softening temperature glass is used as the inorganic component of the composite. In some examples, the glass may be at least one of an oxide glass, a fluoride glass, an oxyfluoride glass, a phosphate glass, a borate glass, a germanate glass, a tellurite glass, a vanadate glass, or combinations thereof. In some examples, the glass may be at least one of alkali-zinc sulfophosphates, tin borophosphates, zinc phosphates, zinc borophosphates, tin phosphates, zinc borates, bismuth borates, zinc bismuth borates, tin-zinc borophophates, antimony germanates, tellurites, tellurium vanadates, flourophosphates, tin fluorophosphates, alkali fluorophosphates, alkali-aluminum fluorophosphates, alkali-tantalum borophosphates, tin silicates, alkaline earth aluminoborates, alkali aluminophosphates, alkaline earth aluminophosphates, alkali borophosphates, alkali-zinc phosphates, alkali-tin-zinc phosphates, alkali-aluminum borophosphates, or combinations thereof.

Table 1 below describes the compositions and properties of three types of tin borophosphate glasses used as examples in demonstrating organic-inorganic composites and methods of formation. Composition was determined using inductively-coupled plasma mass spectrometry (ICP/MS) and transition temperatures were determined using differential scanning calorimetry (DSC). Excess non-analysed components may include $H_2O$ or trace impurities.

TABLE 1

|  | Glass A | Glass B | Glass C |
| --- | --- | --- | --- |
| Composition (wt. %) |  |  |  |
| $B_2O_3$ | 0.86 | 0.85 | 1.49 |
| $P_2O_5$ | 33.6 | 33.4 | 33.6 |
| SnO | 64.2 | 64.4 | 65.1 |
| Transition Temperature (° C.) |  |  |  |
| $T_g$ Onset | 262.2 | 264.7 | 284.7 |
| $T_x$ Onset | 423.3 | 411.8 | 470.9 |
| $T_x$ Peak | 443.1 | 432.6 | 501.0 |

Glass A and Glass B were targeted to be approximately the same composition and both comprise lower boron contents, thereby allowing for lower $T_g$ and lower viscosity at a given temperature. FIG. 1 demonstrates that the parallel plate viscosities for Glass A and Glass B are close or even overlapping (e.g., at temperatures in a range of 370° C. and 430° C.) with thermoplastic polymers PEI and PES. Glass C, which comprises only a slight increase in boron content as compared with Glasses A and B, has a viscosity that is closer to PEI and PES within the same temperature range than other glasses such as some alkali zinc phosphates. Glass C also has a lower crystallization tendency as compared with Glasses A and B, as indicated by its higher $T_x$Onset temperature ($T_x$Onset for Glass A and B is 423.3° C. and 411.8° C., respectively, versus for Glass C, which is 470.9° C.).

Crystallization temperature is an exothermic event where a liquid change to a solid. The extrapolated onset and peak temperature characterizing the crystallization process is the $T_x$Onset temperature. Typically, a lower $T_x$Onset or a smaller gap between $T_g$ and $T_x$Onset corresponds to a higher crystallization tendency since there is a smaller processing window available between $T_g$ and $T_x$Onset. Additional factors, such as the area under the isothermic peaks associated with crystallization events, are also good indicators of crystallization tendency. In these examples, Glass C demonstrates significantly smaller area under its crystallization peaks in differential scanning calorimetric (DSC) measurements, as compared to Glass A and Glass B. DSC measures heat flow rate to or from a sample as it is subjected to a controlled temperature program in a controlled atmosphere.

FIG. 1 also illustrates that the viscosity of Glasses A and B drastically increase at a temperature in a range of 390° C. to 410° C. This is likely indicative of an onset of crystallization. Thus, due to the proximity of viscosities between Glasses A, B, and C with polymers PEI and PES within a relatively narrow temperature range, all three glasses are capable of thermal forming of micro- and nano-structured composites (e.g., fibers). In other words, the viscosities of all three glasses are within a desirable range for forming of micro- and nano-structured composites.

Figure 2:
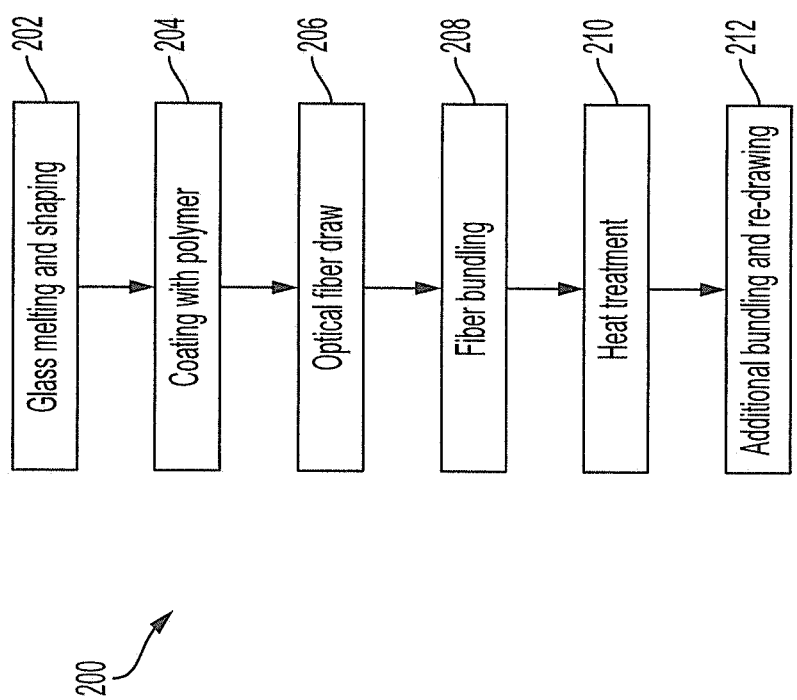
FIG. 2 illustrates a method for formation of an organic-inorganic composite, according to some embodiments.

FIG. 2 illustrates a method 200 for formation of an organic-inorganic composite, according to some embodiments.

In stage 202, the glass is melted and formed into rods using, for example, a molding or extrusion process. In some examples, the rods may have a cross-sectional shape of at least one of a circle, ellipse, any pre-desired polygon (3-sided, 4-sided, 5-sided, 6-sided, etc.), or a combination thereof. In some examples, the inorganic glass comprises at least 20 mol. % of $P_2O_5$ or $B_2O_3$. In some examples, the inorganic glass comprises at least 20 mol. % of ZnO, SnO, or combinations thereof. In some examples, the inorganic glass comprises less than 10 mol. % of a glass additive, the additive including at least one of $SiO_2$, $Al_2O_3$, $TiO_2$, $WO_3$, $CeO_2$, CaO, BaO, SrO, $SO_3$, $MoO_3$, SnO, $SnF_2$, $Sn^0$ metal, ammonium phosphates, or combinations thereof. The additives are used to adjust properties of the glass, such as minimizing crystallization tendency, lowering $T_g$, lowering viscosity, lowering processing temperature, and water (e.g., moisture) durability. The glasses may be free of lead, and in some examples, free of fluorine and chlorine. In some examples, the glasses may comprise less than 10 mol. % of alkali oxides or may be substantially free of alkali. In some examples, the glasses may include a higher boron content than shown in Table 1.

In some examples, the ratio of SnO to $SnO_2$ in the final glass may be greater than 5:1, or greater than 10:1, or greater than 100:1. A high SnO content relative to $SnO_2$ may allow for a desirable combination of characteristics, such as $T_g$, viscosity, crystallization tendency, and water barrier or water resistance properties. To achieve high, repeatable levels of SnO in the final glass, the initial glass melting (or any combination of subsequent processing steps) may be performed in an inert gas environment, or in an ambient environment containing less than 1% or less than 0.1% of atmospheric oxygen or water.

In the examples provided in Table 1, these tin borophosphate glasses (Glass A, Glass B, and Glass C) may be melted from batch materials $Sn_2P_2O_7$ and $H_3BO_3$. In some examples, the batch materials may include at least one of SnO, $SnF_2$, $Sn^0$ metal, Sn organometallic compounds, $Sn^{2+}$-containing oxides, phosphorus oxide, phosphoric acid, ammonium phosphates, or combinations thereof.

Glasses A and B were melted in an argon-filled glove box and Glass C may be melted in an $N_2$-filled retort furnace or glove-box furnace. All three glasses were melted at a temperature in a range of 800° C. to 1200° C. (e.g., 900° C.). Glasses A and B were cooled rapidly by pouring into a mold at room temperature and then transferred to an annealing oven at a temperature in a range of 250° C. to 400° C. (e.g., 300° C.), and then held at that temperature for a time in a range of 6 hrs to 12 hrs (e.g., 8 hrs). A graphite mold may be used because expansion differences between Glasses A and B and the mold allows the casted glass portion to be removed from the mold without requiring the mold to be tapered. Metal molds have higher expansions and when cooled, may contract against the glass, thereby requiring tapered geometries. Cooling was conducted at a rate in a range of 0.05° C./min to 0.5° C./min (e.g., 0.1° C./min) to a temperature in a range of 100° C. to 200° C. (e.g., 150° C.). Glass C was not annealed, and allowed to cool at a rate in a range of 50° C./hr to 150° C./hr (e.g., 100° C./hr) in the $N_2$-filled retort furnace or glove-box furnace where its melting was conducted. Inert gas environments were used to maximize repeatability of the oxidation state of SnO (i.e., minimizing the variability between the ratios of $Sn^{2+}$ to $Sn^{4+}$).

In stage 204, after the melting process, the glass is then coated or encapsulated with a thermoplastic polymer, which is the organic component of the composite. In some examples, the encapsulating may be conducted via spray-coating, dip coating, spin coating, etc. In some examples, the polymer may be at least one of polyetherimide (PEI), polyethersulfone (PES), or a combination thereof. In some examples, the organic-inorganic composite may be formed from a combination of Glass A and at least one of PEI, PES, or PEI and PES. In some examples, the organic-inorganic composite may be formed from a combination of Glass B and at least one of PEI, PES, or PEI and PES. In some examples, the organic-inorganic composite may be formed from a combination of Glass C and at least one of PEI, PES, or PEI and PES.

Alternate polymers with high processing temperatures and relatively high viscosity in the range of processing temperatures of the glasses described herein include: polyphenylsulfone (PPS), polysulfone, polyphenylene sulfide, polyether ether ketone (PEEK), polyamide-imide (PAI), polybenzimidazole (PBI), fluorinated polymers (e.g., polytetrafluoroethylene (PTFE), polyvinylidene fluoride (PVDF), etc.), lower temperature polymers (e.g., nylon, polycarbonate (PC), polyethylene terephthalate (PET), cyclic olefin copolymers, etc.), or combinations thereof.

In stage 206, the glass-polymer combination is heated above the $T_g$ or softening temperature of both the glass and the polymer and drawn into a fiber. In some examples, the $T_g$ or softening temperature of each of the glass and polymer may be less than 450° C., or less than 425° C., or less than 400° C., or less than 375° C., or less than 350° C., or less than 325° C., or less than 300° C., or in a range of 150° C. to 400° C., or in a range of 200° C. to 350° C., or in a range of 250° C. to 350° C., or in a range of 200° C. to 300° C. In some examples, fiber drawing temperatures for tin borophosphate-containing composites may be conducted at a temperature in a range of 275° C. to 425° C., or in a range of 300° C. to 400° C., or in a range of 325° C. to 375° C.

Lower fiber draw (and re-draw) temperatures are typically enabled by lower viscosity of the inorganic component, since in some examples, the inorganic component has higher viscosity than the organic component, and so the inorganic component determines the lowest allowable processing temperature without process failure. Processing at excessively high temperatures may distort or disrupt the micro- or nano-structure of the composite due to interfacial tension forces which are exacerbated by small feature sizes. Thus, lower process temperatures (high average viscosity of both or all material in the composite) may allow for better control of the composite microstructure due to higher process viscosity of the polymer organic and glass inorganic during the re-draw steps. So, for example, the low viscosity of tin borophosphate glass enables a lower fiber draw (and re-draw) temperature and thus, a higher integrity composite microstructure when PEI polymer is used as the organic component.

Thus, as explained above, the relatively close viscosity-temperature behavior between the chosen inorganic glass and organic thermoplastic polymers—as shown in FIG. 1—is an important factor enabling micro- and nano-structured fiber fabrication using a thermal forming process. Because both the organic and inorganic components of the composite system are able to maintain a relatively high viscosity during thermal processing, uniform size and structural arrangement are preserved. If the viscosity of either component becomes undesirably low, the structure may be come prone to disruption via surface/interfacial energy effects such as capillary instability, droplet merging, filament breakup, and the like.

In stage 208, this first fiber is then stacked or bundled into an array of many fibers, bonded together, and then heat treated in stage 210 with a thermal consolidation step and an annealing step. Thermal consolidation and annealing may be conducted, independently, at a temperature in a range of 250° C. to 350° C. for a time in a range of 1 hr to 20 hrs in a vacuum or low-pressure inert environment (e.g., $N_2$, Ar, He, etc.). In some examples, thermal consolidation and annealing may be conducted, independently, at a temperature in a range of 280° C. to 300° C. In some examples, thermal consolidation and annealing may be conducted, independently, for a time in a range of 2 hrs to 10 hrs. In some examples, the thermal consolidation may be conducted prior to the annealing. In some examples, the thermal consolidation may be conducted after the annealing. Stages 202 to 210 are step 1 of the process to form organic-inorganic composites according to embodiments disclosed herein.

Thereafter, in stage 212, additional bundling and re-drawing may be performed to form composite containing micro- and nano-structured inorganic fibers with an average cross-sectional dimension, for example, below 30 µm substantially surrounded by an organic matrix. The bundling and re-drawing is repeated a plurality of times to achieve a desired reduced domain size. In some examples, the optical fiber draw (sum total of original draw and re-draws) may be performed at least two times. In some examples, the optical fiber draw may be performed at least three times. In some examples, the optical fiber draw may be performed at least four times. Stage 212 may be part of steps 2 and 3 of the process to form organic-inorganic composites according to embodiments disclosed herein.

The final resulting inorganic fiber cross-section diameters (as an average of all the fibers, or as a portion of the fibers of from 10% to 50% of the population or more) may be less than 30 µm. In other words, at least 50%, or at least 60%, or at least 70%, or at least 80%, or at least 90%, or at least 95%, or at least 99%, or at least 99.9% of the inorganic glass domain has a length of less than 30 µm, or less than 20 µm, or less than 10 µm, or less than 5 µm, or less than 3 µm, or less than 2 µm, or less than 1 µm, or less than 0.5 µm, or less than 0.3 µm, or less than 0.2 µm, or less than 0.1 µm, as measured along at least one cross-sectional dimension, including intermediate values and ranges.

The final resulting organic fiber cross-section diameters (as an average of all the fibers, or as a portion of the fibers of from 10% to 50% of the population or more) may be less than 30 µm. In other words, at least 50%, or at least 60%, or at least 70%, or at least 80%, or at least 90%, or at least 95%, or at least 99%, or at least 99.9% of the organic polymer domain has a length of less than 30 µm, or less than 20 µm, or less than 10 µm, or less than 5 µm, or less than 3 µm, or less than 2 µm, or less than 1 µm, or less than 0.5 µm, or less than 0.3 µm, or less than 0.2 µm, or less than 0.1 µm, as measured along at least one cross-sectional dimension, including intermediate values and ranges.

In some examples, the organic-inorganic composite at least 30% of the inorganic glass by volume of the composite. In some examples, a total optical transmission of the organic-inorganic composite is at least 20% through a 0.5 mm thick cross-section. In some examples, an average tensile breakage strength of the organic-inorganic composite is at least 100 MPa. In some examples, at least 50% of the inorganic glass domains and at least 50% of the polymer domains each have a length of less than 0.5 μm as measured along at least one cross-sectional dimension.

In some examples, the inorganic glass domains have an average length as measured along at least one cross-sectional dimension (e.g., diameters, center-to-center spacing of adjacent inorganic domains, an edge-to-edge spacing of adjacent inorganic domains, etc.) such that at least 90% of all inorganic glass domains have a length as measured along at least one cross-sectional dimension within 50% of the average length. For example, supposing the average cross-sectional diameter of the inorganic glass domain fibers after step 3 is a particular value, then at least 90% of all inorganic glass domain fibers would have a cross-sectional diameter within 50% of the particular value.

In some examples, where the inorganic glass domain is a shape of a two-dimensional planar layer, the inorganic glass domains are structured around three geometric axes, where a smallest length of the inorganic glass domains is along a first geometric axis of the inorganic glass domain, and where the second and third geometric axes have lengths greater than the smallest length. In some examples, where the inorganic glass domain is a shape of a fiber, filament, ribbon, or a combination thereof, the inorganic glass domains are structured around three geometric axes, where a smallest length of the inorganic glass domains is along a first geometric axis and a second geometric axis of the inorganic glass domain, and where the third geometric axis has a length greater than the smallest length. In some examples, where the inorganic glass domain is a shape of a sphere, brick, platelet, or a combination thereof, the inorganic glass domains are structured around three geometric axes, where the length of the inorganic glass domains is similar or within the same order of magnitude (e.g. less than 10× difference) along all three geometric axes.

EXAMPLES

Example 1: Organic-Inorganic Composite Fiber

FIG. 3 to FIG. 6 illustrate polished scanning electron microscope (SEM) cross-sectional images of tin borophosphate glass (Glass A) and PEI polymer composite fiber, according to some embodiments.

Step 2—One Additional Bundling and Re-Drawing

Figure 3:
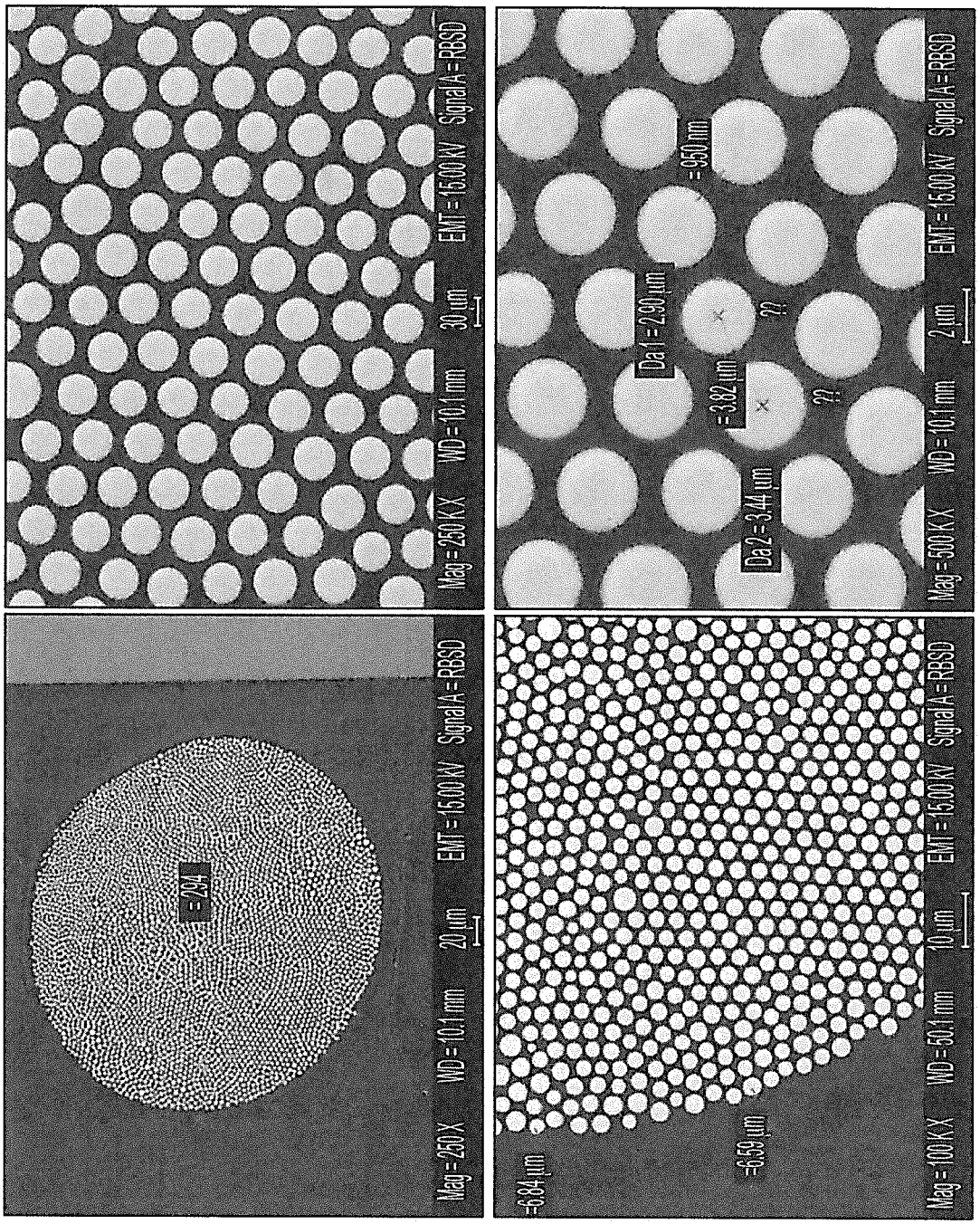
FIG. 3 to FIG. 6 illustrate polished scanning electron microscope (SEM) cross-sectional images of tin borophosphate glass (Glass A) and PEI polymer composite fiber, according to some embodiments.

FIG. 3 shows polished SEM cross-sectional images of tin borophosphate glass (Glass A) and PEI polymer 'step 2' composite fiber, whereby the macroscopic shape of the composite (top-left) is a continuous cylindrical fiber of approximately 300 μm in diameter and including over a 1000 glass (inorganic) domains (bright regions). The tin borophosphate glass domains form elongated, continuous or semi-continuous cylindrical filaments with a well-controlled diameter in a range of 2.5 μm to 4.0 μm and a center-to-center spacing (of adjacent filaments) in a range of 3.5 μm to 5.5 μm (bottom-right), separated by a continuous polymer domain of PEI (dark regions). In other words, the polymer domains are positioned between adjacent inorganic glass domains. A well-ordered, hexagonal-packing arrangement structure is observed despite random manual bundling of the fibers before heat treatment and re-draw. After a first re-draw, the volume fraction of the inorganic domain in the composite is in a range of 55% to 80% (e.g., 60%). The effective strength of the 'step 2' composite fiber was tested in a simple tensile pull test, pulling the fibers along their length axis until failure. The failure strength of these 'step 2' micro-structured composite fibers was 150±18 MPa, which demonstrates both a higher average failure stress and smaller standard deviation of failure stress than the parent single core-clad 'step 1' fibers (which demonstrated a failure strength of 82±30 MPa in the same test).

Step 3—Two Additional Bundlings and Re-Drawings

Figure 4:
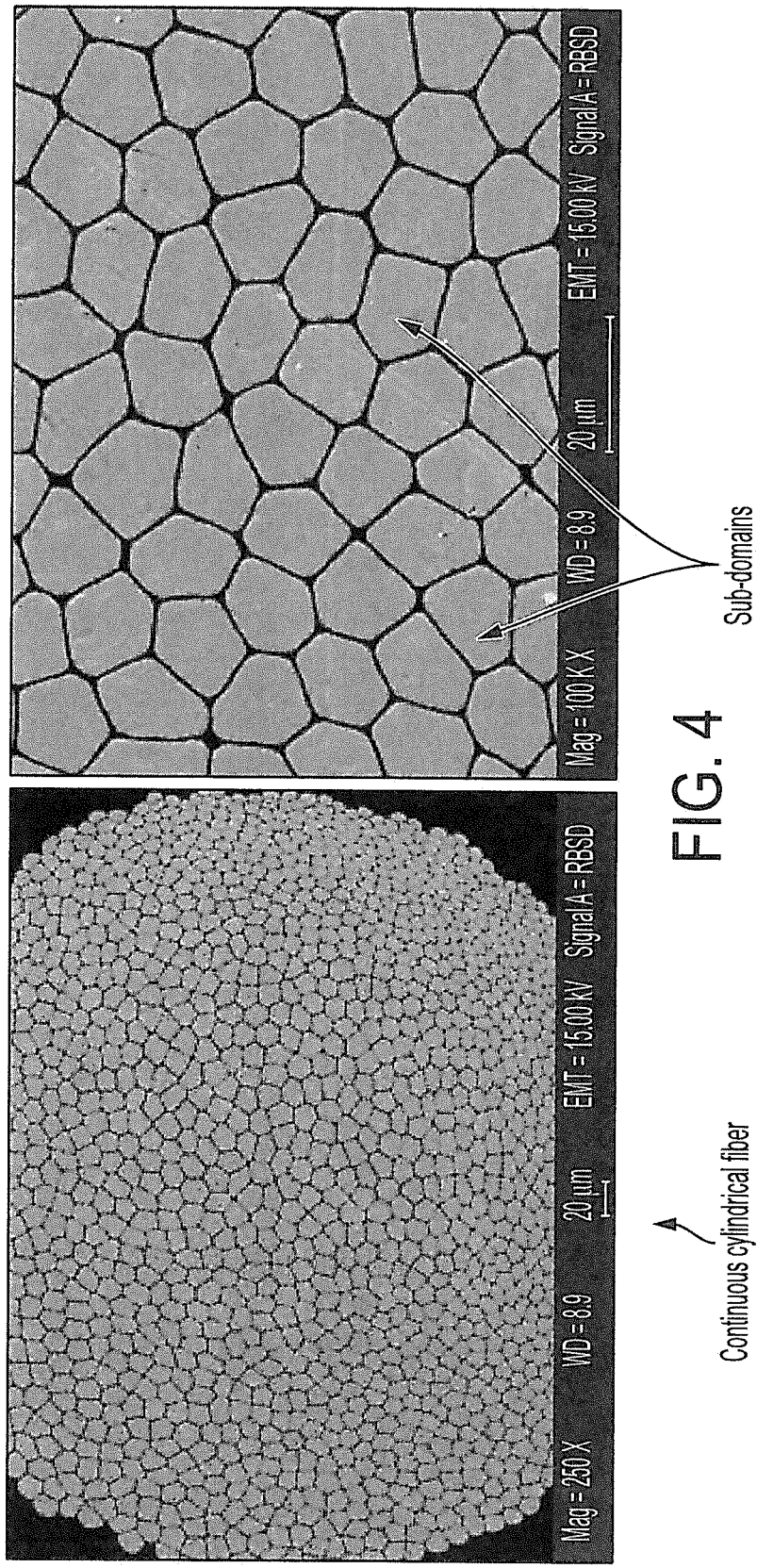
Figure 5:
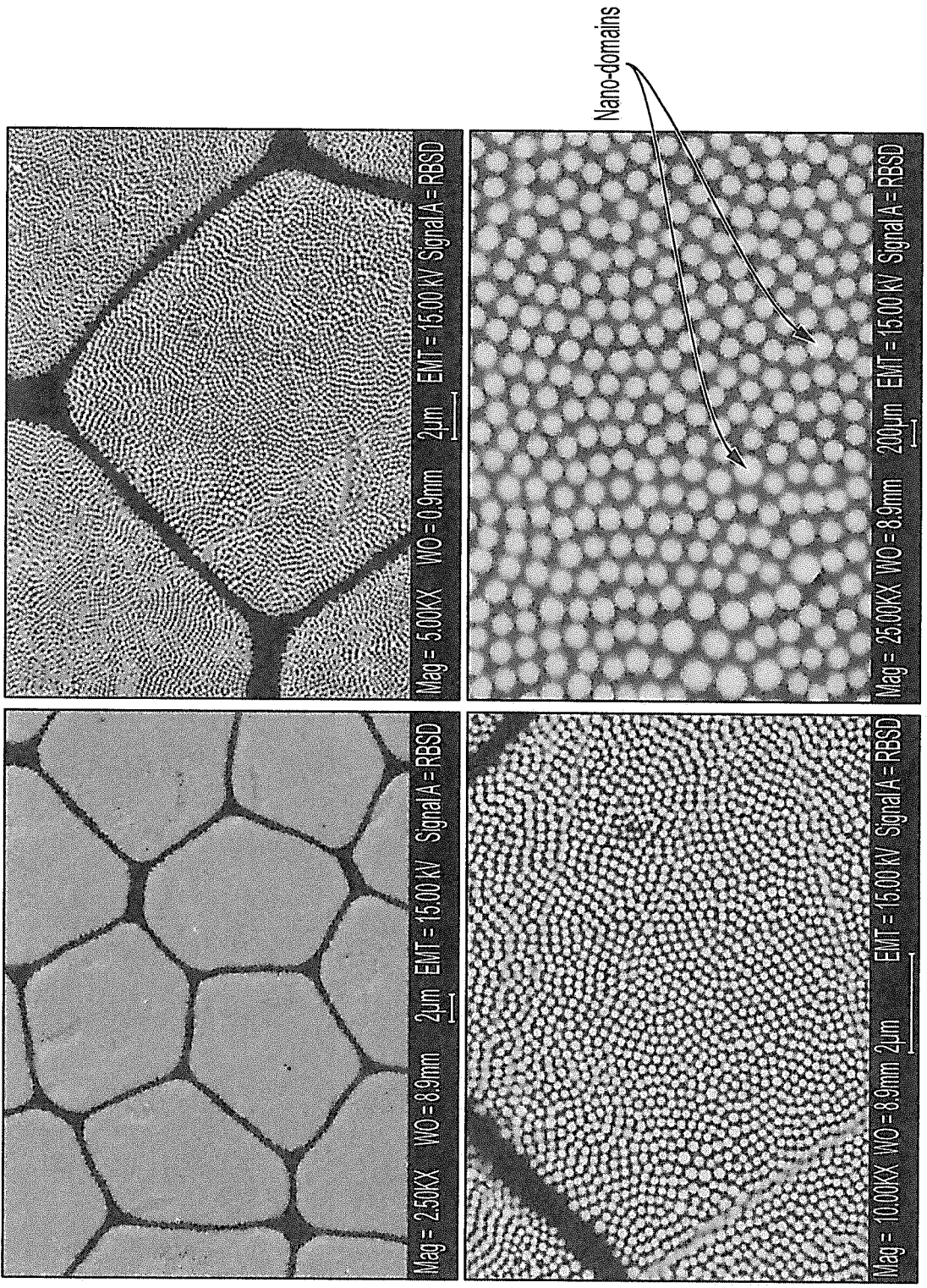
Figure 6:
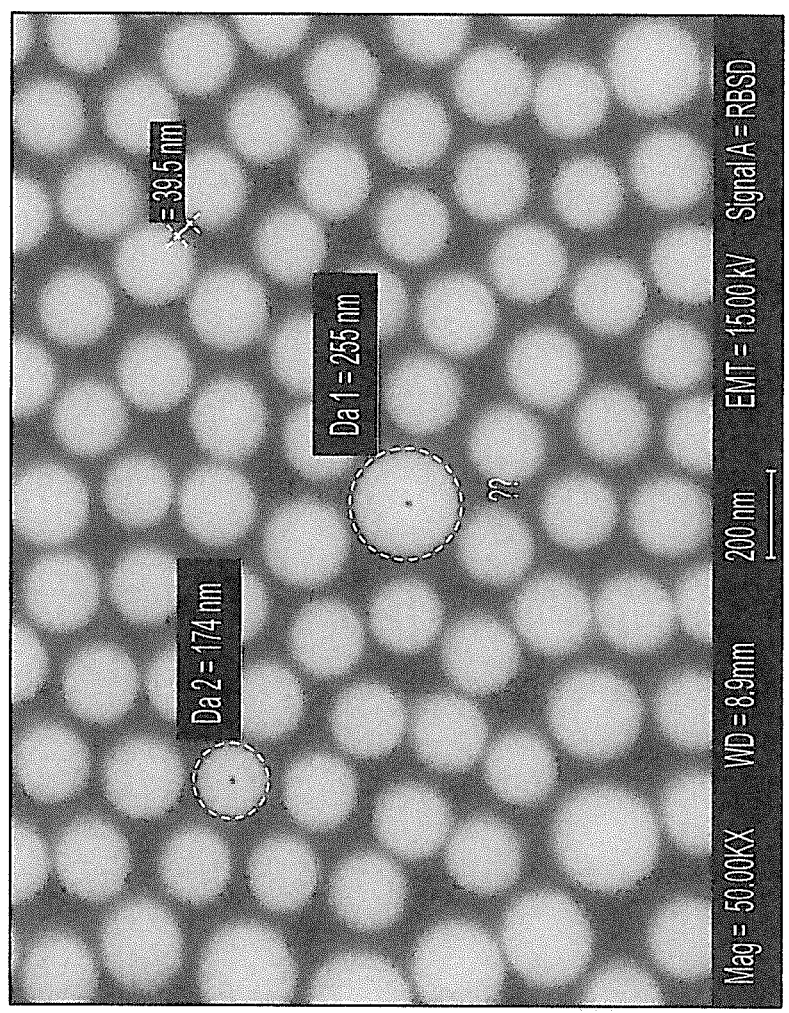

FIGS. 4-6 show polished SEM cross-sectional images of tin borophosphate glass (Glass A) and PEI polymer 'step 3' composite fiber. Specifically, FIG. 4 illustrates the macroscopic shape of the composite (left; blown-up, right) as a continuous cylindrical fiber of approximately 500 μm in diameter and having a hierarchical microstructure of over 1000 composite polygonal sub-domains of about 20 μm in size and over 1,000,000 glass (inorganic) nano-domains. FIG. 5 illustrates a magnified view of the sub-domains to more clearly show the nano-domains composed therein. The tin borophosphate glass nano-domains (bright regions) form elongated, continuous or semi-continuous cylindrical filaments with a well-controlled diameter in a range of 50 nm to 400 nm (e.g., about 200 nm), separated by a continuous polymer domain of PEI (dark regions). As shown clearer still in FIG. 6, adjacent tin borophosphate glass domains may be separated from one another (edge-to-edge) by a length of at least 20 nm (e.g., 39.5 nm).

Thus, in comparing the diameters of the tin borophosphate glass domains after one additional bundling and re-drawing (step 2, FIG. 3) (about 2.5 μm to 4.0 μm) versus after two additional bundlings and re-drawings (step 3, FIGS. 4-6) (about 50 nm to 400 nm), each additional bundling and re-drawing reduces the size of the tin borophosphate glass domain diameter. One effect of re-drawing is extending the length of the fibers in the z-direction, while shrinking their structural features in the x-y directions. Similar effects may be achieved using other processes, such as co-extrusion of glass and polymer through a complex die.

Example 2: Organic-Inorganic Composite Ribbons

In addition to reporting on fiber bundling and re-drawing (as explained above and in Example 1), the present disclosure also provides thermal post-processing methods which allow for a broader range of macroscopic composite geometries (e.g., ribbons; films; sheets; basic non-woven, textile-like meshes, etc.), as well as varying shapes of microstructural elements (e.g., layers; platelets; spheres; elongated ellipses; brick-like structures, etc.).

Figure 7:
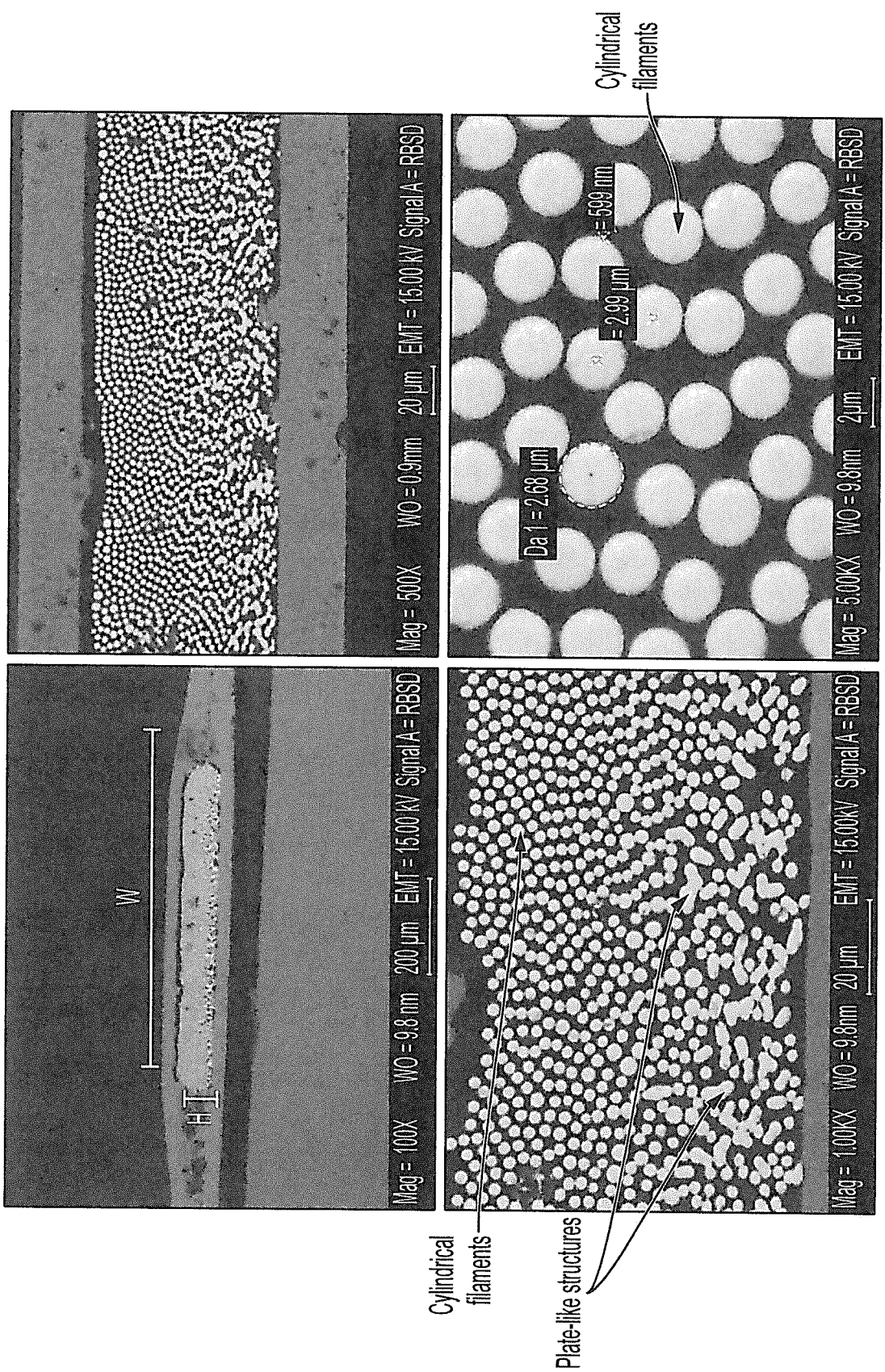
FIG. 7 and FIG. 8 illustrate polished SEM cross-sectional images of tin borophosphate glass (Glass A) and PEI polymer composite ribbon, according to some embodiments.
Figure 8:
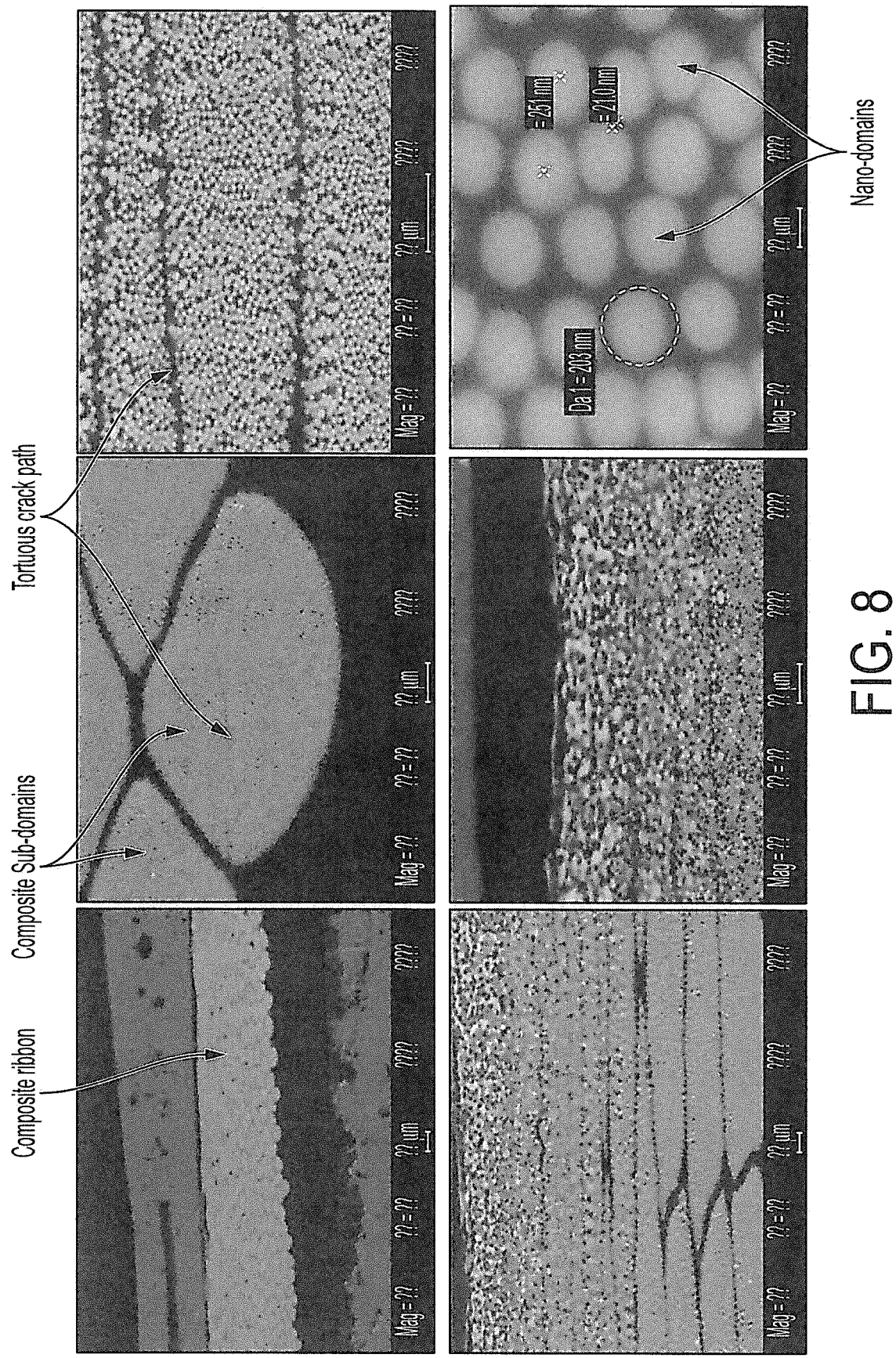

FIG. 7 and FIG. 8 illustrate polished SEM cross-sectional images of tin borophosphate glass (Glass A) and PEI polymer composite ribbon, according to some embodiments.

Step 2—One Additional Bundling and Re-Drawing

FIG. 7 shows polished SEM cross-sectional images of tin borophosphate glass (Glass A) and PEI polymer 'step 2' composite ribbon, whereby the macroscopic shape of the composite (top-left) is a ribbon of approximately 100 μm in height and 700 μm in width and including over a 1000 glass (inorganic) domains (bright regions). The tin borophosphate glass domains form elongated, cylindrical filaments (bottom-right image) with a well-controlled diameter in a range of 2.5 μm to 4.0 μm, a center-to-center spacing (of adjacent filaments) in a range of 2 µm to 5.5 µm, and an edge-to-edge spacing (of adjacent filaments) of at least 250 µm in a top portion of the image (i.e., ribbon) (similar to those described above for the organic-inorganic composite fibers).

Towards a bottom portion of the image (i.e., ribbon), the tin borophosphate glass domains form a mixture of cylindrical and plate-like (or layers, brick-like, or a combination thereof) structures resembling an agglomeration of the cylindrical filaments. These are best seen in the top-right and bottom-left images of FIG. 7. The plate-like structures may have a well-controlled domain characteristic lengths in a range of 1 µm to 20 µm or in a range of 2 µm to 10 µm, separated by a continuous polymer domain of PEI (dark regions). In this example, the plate-like structures are formed by heating, dwelling, and pressing of the microstructured composite under a thermal gradient.

Step 3—Two Additional Bundlings and Re-Drawings

FIG. 8 shows polished SEM cross-sectional images of tin borophosphate glass (Glass A) and PEI polymer 'step 3' composite ribbon, whereby the macroscopic shape of the composite (top-left) is a ribbon of approximately 100 µm in height and 2200 µm in width and having a hierarchical microstructure of over 1000 composite polygonal sub-domains of about 20 µm in size and over 1,000,000 glass (inorganic) nano-domains. The tin borophosphate glass nano-domains (bright regions) form elongated, continuous or semi-continuous cylindrical filaments with a well-controlled diameter in a range of 50 nm to 400 nm (e.g., about 200 nm)—separated by a continuous polymer domain of PEI (dark regions)—in a bottom portion of each image.

Towards the top portion of each image, the glass nano-domains may be at least one of cylindrical, layers, platelets, brick-like, or a combination thereof having domain characteristic lengths in a range of 0.1 µm to 3 µm. The composite sub-domains in the top portion become elongated platelets having a size in a range of approximately 5 µm in height and 40 µm in width.

The tortuous crack path in the top-center image (top-right magnified) indicates a crack-deflecting ability of these composite nano- and micro-structures. Crack path tortuosity is one mechanism for generating elevated toughness. The energy absorbed by crack deflection and tortuosity increases the energy, force, or stress needed to elongate or propagate a crack in the material, which increases the effective toughness of the material.

Example 3: Formation of Organic-Inorganic Composites of Various Shapes

Figure 9:
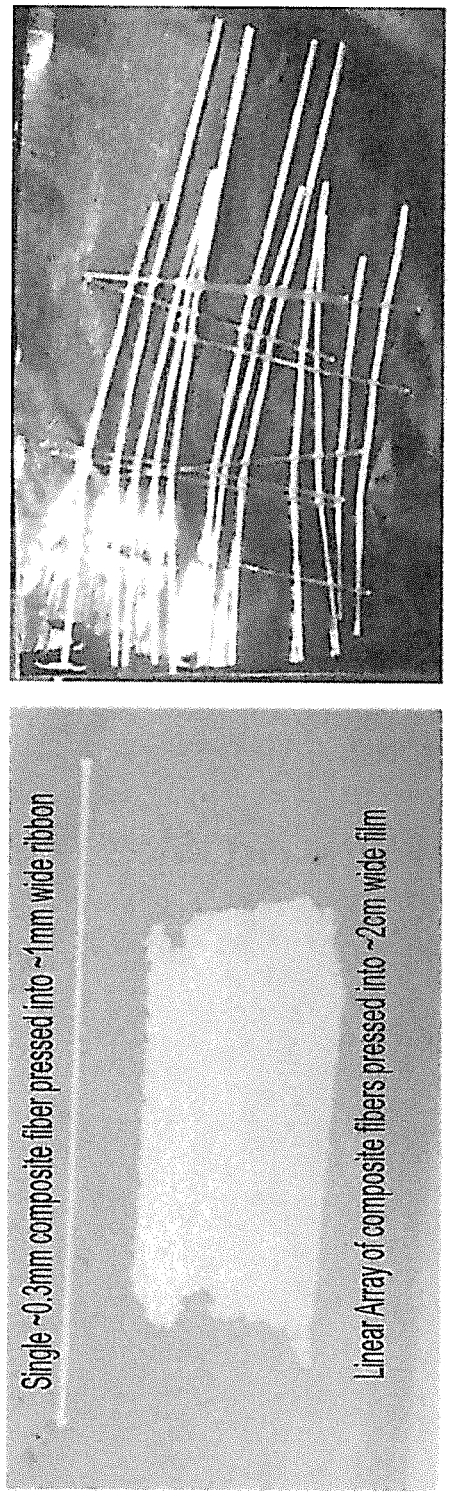
FIG. 9 illustrates macroscopic images of micro-structured composite fibers thermally post-formed into various macroscopic shapes such as ribbon and film (left) and basic non-woven, textile-like meshes (right), according to some embodiments.

FIG. 9 illustrates macroscopic images of 'step 2' microstructured composite fibers thermally post-formed into various macroscopic shapes such as ribbon and film (left) and basic non-woven, textile-like meshes (right), according to some embodiments.

The organic-inorganic composite formed, for example, by method 200 may undergo post-processing steps which include hot-pressing the resulting composite with a cold steel roller on a hot plate set to a temperature in a range of 300° C. to 500° C., or in a range of 350° C. to 450° C., or in a range of 370° C. to 390° C., with the rolling and/or lamination fusing being conducted for a time in a range of 1 second to 60 seconds, or in a range of 2 seconds to 30 seconds, or in a range of 2 seconds to 10 seconds.

The examples of FIGS. 7, 8, and 9 (right) may be formed with hot plate lamination. Thus, the side of the sample in contact with the hot plate experiences a greater thermal deformation of the glass (inorganic) domains, when compared with the heat experienced by the sample bulk or the side of the sample not in contact with the hot plate, which is in contact with the cold roller. This is one possible explanation for the plate-like and/or layers and brick-like structures observed in Example 2.

Figure 10:
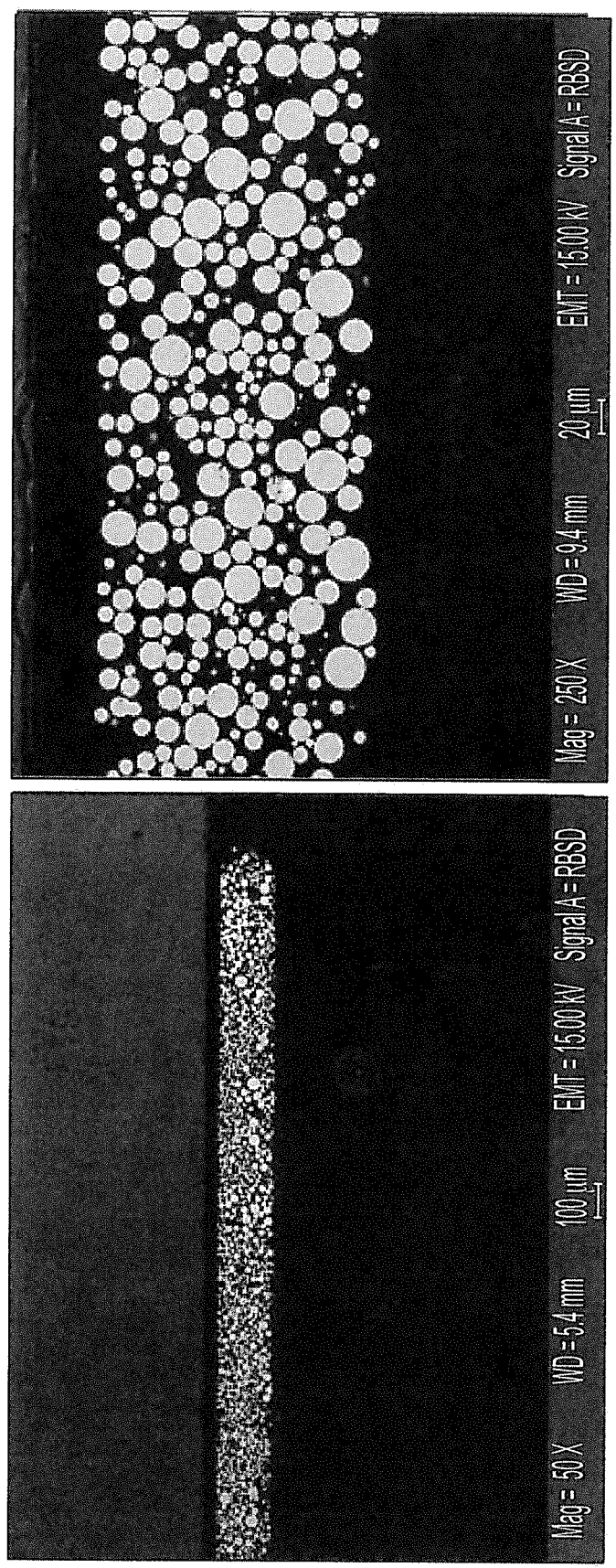
FIG. 10 illustrates polished SEM cross-sectional images of the composite film of FIG. 8 comprising tin borophosphate (Glass A) domains separated by PEI polymer domains, according to some embodiments.

Alternately, sheet and ribbon samples were fabricated under longer processing times in a vacuum oven (FIG. 9 (left) and FIG. 10) heating at a temperature in a range of 300° C. to 400° C., or in a range of 325° C. to 375° C. (e.g., 330° C.), or in a range of 340° C. to 360° C. for a time in a range of 1 hr to 10 hrs, or in a range of 2 hrs to 5 hrs (e.g., 3 hrs). Longer time durations for heat treatment might result in a wider range of microstructural domain size. For example, FIG. 10 illustrates polished SEM cross-sectional images of the composite film of FIG. 8 comprising tin borophosphate (Glass A) domains separated by PEI polymer domains, according to some embodiments. Specifically, FIG. 10 shows polished SEM cross-sections of the composite of FIG. 8 having approximately a 150 µm height and about 2 cm in width. The glass domains have an approximate size in a range of 2 µm to 25 µm.

Thus, the processing conditions provided above (e.g., hot-pressing with a cold steel roller or vacuum oven heating) allow for unique thermal formability of composite materials having varied macroscopic shapes.

Thus, as presented herein, this disclosure relates to organic-inorganic composites and their methods of production. More particularly, the present application provides a method for making the disclosed composite(s) where the organic and inorganic components are both thermally formable due to substantial amorphous, glassy, or thermoplastic character, and the organic and inorganic components are thermally formed in contact with one another at an identical or near-identical process set point temperature(s) in a single process chamber or apparatus.

The thermal forming processes disclosed herein are rapid, scalable, low-cost manufacturing processes. Moreover, thermal forming also allows for subsequent processing to form complex articles (e.g., auto parts, bone replacements, smartphone housings, etc.) derived from organic-inorganic composites provided herein. For example, subsequent processing may include processing the organic-inorganic composites using molding, injection molding, fusing, blowing, embossing, pulling, drawing, extruding, wrapping, weaving, knitting, or 3D printing accompanied with temperature to soften or fuse the initial composite (which may be in the form of sheets, fibers, pellets, etc.). The thermal forming processes of the present application enables inorganic packing fractions which exceed the practical limit of traditional thermal forming or resin casting techniques which are typically based on particle or short fiber filling of an organic matrix. In some examples, the composite may comprise the inorganic glass domain in an amount of at least 30 vol. %, or at least 40 vol. %, or at least 50 vol. %, or at least 60 vol. %, or at least 70 vol. %, or at least 80 vol. %, or at least 90 vol. %. Continuous or semi-continuous composite fibers having an extended inorganic glass fiber with a length-to-diameter ratio of greater than 100, or of greater than 1000, or of greater than 10,000 are feasible using the thermal forming processes disclosed herein due to enhanced strength and toughness of the inorganic glass domains, which are less susceptible to breaking or damaging in thermal molds, dies, or extrusion nozzles.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity. It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A composite having repeating domains of an inorganic glass and a polymer,
   wherein the inorganic glass and the polymer each have a glass transition temperature ($T_g$) or softening temperature of less than 450° C.,
   wherein at least 50% of the inorganic glass domains have a length of less than 30 µm as measured along at least one cross-sectional dimension,
   wherein at least one of the inorganic glass domains comprises a plurality of cylindrical filaments having a diameter in a range of 50 nm to 400 nm separated by a continuous polymer domain, and
   the composite has 50% or more of the inorganic glass by volume of the composite.

2. The composite of claim 1, wherein the inorganic glass domains have an average length as measured along at least one cross-sectional dimension, and wherein at least 90% of the inorganic glass domains have a length as measured along at least one cross-sectional dimension within 50% of the average length.

3. The composite of claim 1, wherein the inorganic glass has a glass transition temperature in a range of 200° C. to less than 450° C., and the polymer is a thermoplastic polymer.

4. The composite of claim 1, wherein the inorganic glass comprises at least one of an oxide glass, a fluoride glass, an oxyfluoride glass, a phosphate glass, a borate glass, a germanate glass, a tellurite glass, a vanadate glass, or combinations thereof.

5. The composite of claim 1, wherein the inorganic glass comprises at least one of alkali-zinc sulfophosphates, tin borophosphates, zinc phosphates, zinc borophosphates, tin phosphates, zinc borates, bismuth borates, zinc bismuth borates, tin-zinc borophophates, antimony germanates, tellurites, tellurium vanadates, fluorophosphates, tin fluorophosphates, alkali fluorophosphates, alkali-aluminum fluorophosphates, alkali-tantalum borophosphates, tin silicates, alkaline earth aluminoborates, alkali aluminophosphates, alkaline earth aluminophosphates, alkali borophosphates, alkali-zinc phosphates, alkali-tin-zinc phosphates, alkali-aluminum borophosphates, or combinations thereof.

6. The composite of claim 1, wherein the polymer comprises at least one of polyetherimide (PEI), polyethersulfone (PES), polyphenylsulfone (PPS), or a combination thereof.

7. The composite of claim 1, wherein:
   at least one of the inorganic glass domains is a discontinuous phase comprising a plurality of adjacent and similarly oriented fibers of an inorganic material,
   the polymer domain is a continuous phase surrounding the plurality of adjacent and similarly oriented fibers of the inorganic material, and
   the composite is a plurality of adjacent and similarly oriented fibers of inorganic material contained within a similarly oriented host fiber of the polymer.

8. The composite of claim 1, wherein at least one of the inorganic glass domains further comprises at least one of cylindrical structures, layers, platelets, brick-like structures, or a combination thereof having a domain characteristic length in a range of 0.1 µm to 3 µm.

9. The composite of claim 1, wherein the inorganic glass comprises:
   a $B_2O_3$ component at a concentration in a range of 0.5 wt. % to 10 wt. %;
   a $P_2O_5$ component at a concentration in a range of 30 wt. % to 40 wt. %; and
   a SnO component at a concentration in a range of 60 wt. % to 70 wt. %.

10. The composite of claim 1, the inorganic glass comprises less than 10 mol. % of a glass additive, the additive including at least one of $SiO_2$, $Al_2O_3$, $TiO_2$, $WO_3$, $CeO_2$, CaO, BaO, SrO, $SO_3$, $MoO_3$, SnO, $SnF_2$, Sn metal, ammonium phosphates, or combinations thereof.

11. The composite of claim 1, wherein at least 90% of the inorganic glass domains have a length of less than 5 µm as measured along the at least one cross-sectional dimension.

12. The composite of claim 1, wherein at least 90% of the inorganic glass domains have a length of less than 1 µm as measured along the at least one cross-sectional dimension.

13. A composite having repeating domains of an inorganic glass and a polymer,
   wherein the inorganic glass and the polymer each have a glass transition temperature ($T_g$) or softening temperature of less than 450° C.,
   wherein at least 50% of the inorganic glass domains have a length of less than 30 µm as measured along at least one cross-sectional dimension, and
   wherein at least one of the inorganic glass domains is a fiber having a length-to-diameter ratio of greater than 100, and the fiber has a diameter less than 2 µm.

14. The composite of claim 13, wherein the composite has 50% or more of the inorganic glass by volume of the composite.

15. The composite of claim 13, the diameter of the fiber is in a range of 50 nm to 400 nm.

16. The composite of claim 13, wherein the inorganic glass and the polymer each have a glass transition temperature ($T_g$) or softening temperature in a range of 200° C. to 300° C.

17. The composite of claim 13, wherein at least 90% of the inorganic glass domains have a length of less than 1 µm as measured along the at least one cross-sectional dimension.

18. The composite of claim 13, wherein the polymer comprises at least one of polyetherimide (PEI), polyethersulfone (PES), polyphenylsulfone (PPS), or a combination thereof.

* * * * *